Henry E. Shaffer,
Fruit-Jar.

4466

REISSUED JUL. 4 1871

Witnesses:

Parker H. Sweet, Jr.

James L. Norris.

Inventor.

Henry E. Shaffer

Per J. Fraser & Co., attys

Rochester, N.Y.

UNITED STATES PATENT OFFICE.

HENRY E. SHAFFER, OF ROCHESTER, NEW YORK.

IMPROVEMENT IN FRUIT-JARS.

Specification forming part of Letters Patent No. 96,490, dated November 2, 1869; reissue No. 4,460, dated July 4, 1871.

*To all whom it may concern:*

Be it known that I, HENRY E. SHAFFER, of the city of Rochester, in the county of Monroe and State of New York, have invented a certain new and useful Improvement in Fruit-Jars, of which the following is a specification:

This invention consists in the construction of the cover and of the top of the jar, and of the combination of the several parts, whereby the gasket is inclosed or embedded so as to be removed from contact both with the clamping-ring and the contents of the jar, and to insure a more perfect sealing of the jar.

Figure 1:
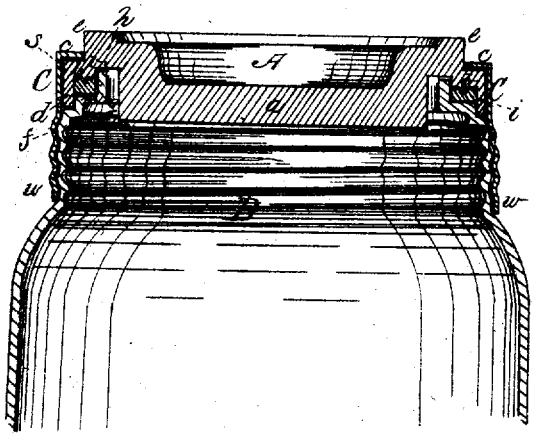
Figure 2:
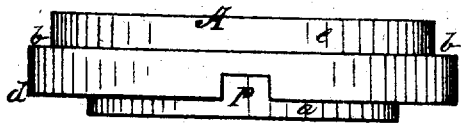
Figure 3:
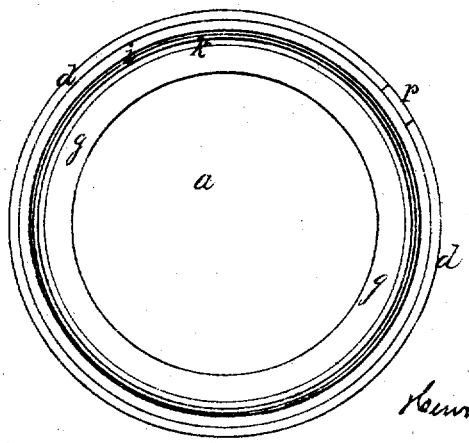

In the drawing, Fig. 1 is a section of the top of the jar; Fig. 2, a side view of the cover; and Fig. 3, a bottom view of the same.

A represents the cover; B, the jar-neck; and C, the clamp-ring. The cover has an exterior shoulder, *b*, to receive the flange of the clamp-ring; it also has an interior shoulder, *k*, preferably armed with a sharp edge, *i*, to bear upon the gasket, and outside this it has a vertically-projecting rim or flange, *d*, which shuts down past the edge of the gasket and holds it in place, as will presently be described. This rim is provided with a notch, *p*, for the easy insertion of a sharp-pointed instrument to admit air to the jar. The jar-neck has a top rim or flange, *h*, which sets up into the cover; outside this a primary shoulder, *m*, which receives the gasket; and still outside and below this, a secondary shoulder, *f*, which stands flush with rim *d* of the cover, and below both these shoulders it has a screw-thread, *v*, for receiving the screw of the clamp-ring. The clamp-ring consists simply of a horizontal rim, *c*, for holding on top the cover, and a vertical-threaded flange, *w*, corresponding and engaging with the threads of the jar-neck.

By this combined construction I accomplish an effect never before accomplished where a screw-clamp ring is used to seal with a vertical pressure, viz.: I inclose or embed the gasket perfectly against outside contact with the ring or inside contact with the contents of the jar. On the outside the gasket is protected by the vertical flange *d* of the cover; on the inside it is protected by the top rim *h* of the jar-neck; while at top and bottom it is inclosed by the shoulders *k* *m*, the inclosure thus being perfect. Heretofore, in all jars of this class, the outer edge of the gasket has come in contact with the clamp-ring, which, in its turning movement, is liable, by the friction produced, to draw it out of place and render the sealing very unreliable. My construction also prevents the crushing out of the gasket, which, in the ordinary jar, is a source of great difficulty. In the relation above described the construction both of the cover and of the top of the jar presents some advantages never before known. The inclosing of the gasket on the outside is due simply to the use of the flange *d* of the cover, which projects down over it. This flange, in itself, is not new, but so far as I am aware it has never before been employed in combination with the shoulder *k* on the inside, which rests on top the gasket. By this construction only is it adapted to use with a jar-neck which has the top rim *h* with the gasket resting on a shoulder of the neck below the rim; therefore the construction is special in this connection. In the same manner, although the top rim *h* and the shoulder *m* of the jar-neck are old, the construction of the same with the secondary shoulder *f* is new, and said shoulder enters as a necessary part in its adaptation to the rim *d* for producing a flush surface for the fitting of the clamp-ring and for closing the joint which reaches to the gasket.

What I claim, and desire to secure by Letters Patent, is—

The top of the jar constructed as described, with the two exterior shoulders *f m* and raised flange *h*, in combination with the cover having the vertical flange *d*, notch *p*, and interior horizontal shoulder or bearing *k*, and with the horizontal gasket, all arranged as herein set forth and shown for the purpose specified.

In witness whereof I have hereunto signed my name in the presence of two subscribing witnesses.

HENRY E. SHAFFER.

Witnesses:
R. F. OSGOOD,
G. WILLM. MIATT.